US012663096B2

(12) United States Patent
Ochibe et al.

(10) Patent No.: US 12,663,096 B2
(45) Date of Patent: Jun. 23, 2026

(54) ACTUATOR, OPEN/CLOSE VALVE MECHANISM, AND FLUID CONTROL DEVICE

(71) Applicants: FUJIKURA COMPOSITES INC., Tokyo (JP); FUJIKIN INCORPORATED, Osaka (JP)

(72) Inventors: Shono Ochibe, Saitama (JP); Shouichi Nagashima, Saitama (JP); Tomohiro Nakata, Osaka (JP); Nobuo Nakamura, Osaka (JP)

(73) Assignees: FUJIKURA COMPOSITES INC., Tokyo (JP); FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 18/875,161

(22) PCT Filed: Jun. 5, 2023

(86) PCT No.: PCT/JP2023/020735
§ 371 (c)(1),
(2) Date: Dec. 15, 2024

(87) PCT Pub. No.: WO2023/243452
PCT Pub. Date: Dec. 21, 2023

(65) Prior Publication Data
US 2025/0369533 A1 Dec. 4, 2025

(30) Foreign Application Priority Data

Jun. 16, 2022 (JP) ................................. 2022-097678

(51) Int. Cl.
*F16K 31/122* (2006.01)
*F15B 11/036* (2006.01)
*F15B 15/14* (2006.01)

(52) U.S. Cl.
CPC ...... *F16K 31/1225* (2013.01); *F15B 11/0365* (2013.01); *F15B 15/14* (2013.01);
(Continued)

(58) Field of Classification Search
CPC .............. F16K 31/1225; F16K 31/122; F16K 31/1221; F15B 11/0365; F15B 15/14; F15B 15/1447; F15B 15/1466
(Continued)

(56) References Cited

U.S. PATENT DOCUMENTS 6,357,339 B1* 3/2002 Ejiri ................... F16K 31/1225
251/63.5
9,995,322 B2* 6/2018 Ejiri ..................... F16K 31/122
(Continued)

FOREIGN PATENT DOCUMENTS

| JP | 11-325303 A | 11/1999 |
| JP | 6170635 B2 | 8/2017 |
| WO | 2016056066 A1 | 6/2017 |

OTHER PUBLICATIONS

Written Opinion by the International Searching Authority for related patent application PCT/JP2023/020735 prepared by the Japanese Patent Office and dated Aug. 1, 2023.
(Continued)

*Primary Examiner* — John Bastianelli
(74) *Attorney, Agent, or Firm* — SHAKIR LAW PLLC; Hassan Abbas Shakir

(57) ABSTRACT

An actuator includes a casing, a shaft body disposed inside the casing, and formed with a long hole LH and multiple exhaust holes EH; multiple assemblies arranged to correspond to the multiple exhaust holes EH, respectively, each assembly having a partition body and a piston body, and forming a closed space with each partition body, each partition body abutting an inner circumferential surface of
(Continued)

the casing over the entire circumference while allowing penetration of the shaft body, each piston body allowing the shaft body to penetrate it; a biasing body biases a piston body from an upper end side toward a lower end side; and a push rod connected to an opposite side of the shaft body with respect to an opening of the shaft body. An open/close valve mechanism includes the actuator, a valve body, and a body, and has a function of controlling communication and shut-off of fluid.

10 Claims, 9 Drawing Sheets

(52) U.S. Cl.
CPC ...... *F15B 15/1447* (2013.01); *F15B 15/1466* (2013.01); *F16K 31/122* (2013.01); *F16K 31/1221* (2013.01)

(58) Field of Classification Search
USPC .......................................................... 251/62
See application file for complete search history.

(56) References Cited

U.S. PATENT DOCUMENTS

| | | |
|---|---|---|
| 2017/0292542 A1 | 10/2017 | Ejiri et al. |
| 2020/0318754 A1* | 10/2020 | Iwata .................. F16K 31/1225 |

OTHER PUBLICATIONS

International Search Report for related patent application PCT/JP2023/020735 prepared by the Japanese Patent Office and dated Aug. 1, 2023, English version provided.

* cited by examiner

COMPARATIVE EMBODIMENT (upstream side in the flow direction)

piston body
partition body
one assembly
large diameter O-ring
small diameter O-ring
the other assembly (downstream side in the flow direction)

one assembly
the other assembly
gap

ACTUATOR, OPEN/CLOSE VALVE MECHANISM, AND FLUID CONTROL DEVICE

CROSS-REFERENCE TO RELATED APPLICATIONS

This application is a national stage under 35 U.S.C. § 371 of PCT patent application PCT/JP2023/020735 filed on 5 Jun. 2023, which is pending and which is hereby incorporated by reference in its entirety for all purposes.

Application PCT/JP2023/020735 claims priority to Japanese Patent Application No. 2022-097678, filed on Jun. 16, 2022. The entirety of the Japanese application is incorporated by reference into this application.

FIELD OF THE INVENTION

The present invention relates to an actuator, an open/close valve mechanism, and a fluid control device.

BACKGROUND

As shown in FIG. 2, FIG. 4, etc., Patent Document 1 discloses a multi-stage piston actuator including a cylindrical body, multiple piston bodies, multiple partitions, a coil spring, and a push rod, and an opening/closing valve mechanism having this multi-stage piston actuator.

Each of the piston bodies is combined with a partition that fits into the cylindrical body, forming a pressure chamber between them. Each piston body has a pressure plate, an axial rod that extends from the pressure plate in one direction in the thickness direction and has an axial air passage that communicates with the pressure chamber, and a sliding guide tubular part that extends in the other direction in the thickness direction. Each partition has a bottom plate part with a through hole formed therein that receives the axial rod of the adjacent piston body, a large-diameter outermost tubular part that extends from the bottom plate in one direction in the thickness direction and fits into the cylindrical body, and a sliding guide tubular part that extends in one direction in the thickness direction and slidably fits into the sliding guide tubular part of the piston body, and each piston constitutes each unit that is arranged so as to overlap along the axial direction of the cylindrical body. The coil spring is compressed and arranged between the multiple units and one end wall of the cylindrical body. The push rod is arranged on the other axial end side of the multiple units.

With the described structure above, when compressed air is supplied from the outside to the inside of the cylindrical body of this multi-stage piston actuator, pressure that resists the spring pressure from the coil spring is exerted on each pressure chamber, and the axial rods of each piston body come into mechanical contact with each other, exerting an output on the push rod.

PRIOR ART DOCUMENTS

Patent Documents

[Patent document 1] Japanese Patent No. 6170635

SUMMARY OF THE INVENTION

Problem That the Invention Aims to Solve

In the multi-stage piston actuator disclosed in Patent Document 1, several units each composed of a piston body and a partition are stacked in the axial direction by themselves, and are arranged inside a casing with their upper ends biased by a coil spring. With this multi-stage piston actuator, immediately after the driving fluid supplied to the casing from the outside is sent into the pressure chamber of one unit, there is a risk that the piston body of another unit adjacent to the first unit on the downstream side in the flow direction of the driving fluid will become separated in the axial direction from the piston body of the first unit. As a result of this movement, the piston bodies move sequentially from the uppermost one to the upstream side in the flow direction of the driving fluid. Due to the above, it takes more time for the piston body, which located at the bottom end, to rise and the valve to be in the open state than when the piston bodies move together. As a result of the above, the multi-stage piston actuator disclosed in Patent Document 1 has a long-time lag from receiving an open command to opening the valve, which adversely affects responsiveness.

One of the objects of the present invention is to provide an actuator having superior responsiveness compared to an actuator in which multiple assemblies arranged inside a casing are stacked and arranged in the axial direction only by these assemblies, and to provide an open/close valve mechanism including this actuator

Means for Solving the Problem

An actuator of the first aspect includes:

a casing having an inlet hole formed at one end through which a driving fluid is introduced from its outside;

a shaft body arranged inside the casing along the axial direction of the casing, formed with an elongated hole that opens in the same direction as the inlet hole and runs along the axial direction, and multiple exhaust holes that communicate with the elongated holes and are arranged at set intervals along the axial direction, and introducing the driving fluid introduced from the inlet through the opening of the elongated hole and discharging it from the multiple exhaust holes;

a partition body includes a disk body having a first through hole formed in the center, and an outer cylindrical body standing on the periphery of the disk body and abutting against the inner peripheral surface of the casing;

multiple assemblies consist of a piston body having a rod-shaped cylindrical body that is inserted into the first through hole and has a second through hole formed in the center, and are arranged at multiple positions inside the casing corresponding to the multiple exhaust holes; and, a biasing body disposed within the casing, wherein:

each partition body in the multiple assemblies abuts against the adjacent partition body in the axial direction at the end surface of the outer cylindrical body and the disk body, and each piston body abuts against the adjacent piston body in the axial direction at the rod-shaped cylindrical body;

each piston body passes through the second through hole so that the shaft body can abut against it, and together with each partition body, forms a closed space communicating with each exhaust hole at each position of the multiple exhaust holes;

one of the piston bodies located on the most one end side or the most other end side is connected to the shaft body; and, the biasing body biases the piston body connected to the shaft body in a direction against the pressure of the driving fluid.

The actuator of the second aspect is the actuator of the first aspect, wherein:

an internal thread is formed on the inner peripheral surface of the other end of the second through hole in the piston body on the first end side;

an external thread is formed on the outer peripheral surface of one end side of the shaft body; and, the piston body at the first end is connected to the shaft body by screwing the internal thread and the external thread together.

The actuator of the third aspect is the actuator of the first aspect, wherein:

the portion of the shaft body at the other end in the axial direction has a cylindrical body with an annular plane facing one end in the axial direction and an outer peripheral surface with the same outer diameter as the rod-shaped cylindrical body; and, the cylindrical body supports the piston body at the other end in the axial direction among all the piston bodies constituting the multiple assemblies with the annular plane, while forming the closed space together with the assembly at the other end in the axial direction among the multiple assemblies.

The actuator of the fourth aspect is the actuator of the third aspect, wherein the other end portion in the axial direction has a connecting portion.

An open/close valve mechanism having the actuator according to any one of the first to fourth aspects.

The opening/closing valve mechanism of the first aspect is the actuator of the first aspect having a bellows structure connected to the connecting portion.

A fluid control device of one aspect includes the open/close valve mechanism according to the first aspect or the second aspect.

Effects of the Invention

The actuators of the first to fourth aspects, the open/close valve mechanism having the actuators, and the fluid control device including the open/close valve mechanism have an actuator with the described structure above, and therefore are actuators, open/close valve mechanisms, and fluid control devices with superior responsiveness compared to actuators in which multiple assemblies arranged inside a casing are stacked and arranged in the axial direction only with these assemblies.

DETAILED DESCRIPTION

Overview

Figure 1:
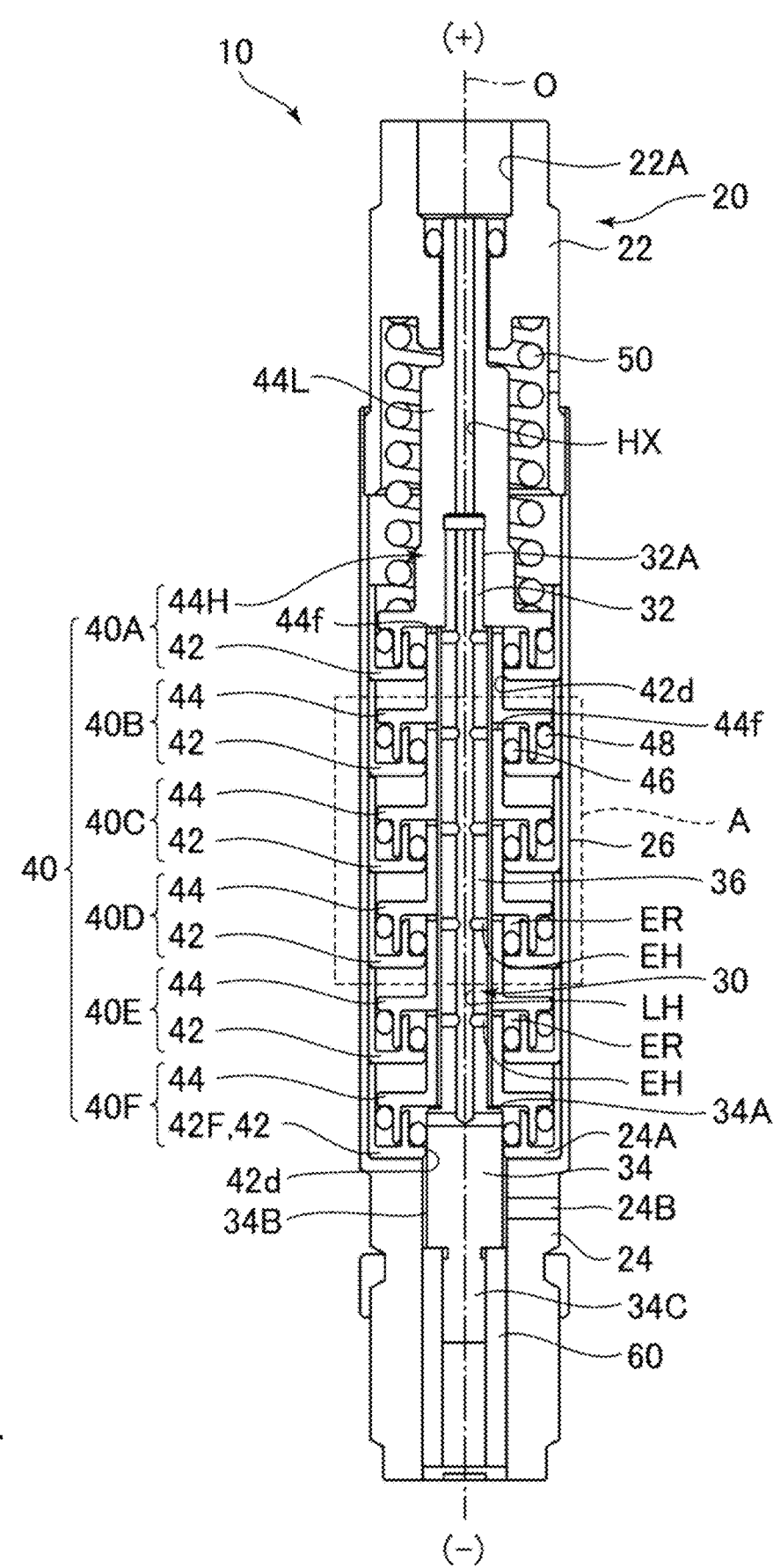
FIG. 1 is a diagram of an actuator for driving an open valve of a normally closed valve according to an embodiment of the present invention (hereinafter referred to as this embodiment), and is a vertical cross-sectional view in a state where no driving fluid has been introduced into the inside of the casing (at zero stroke).

Below, this embodiment and several modified examples thereof will be described. First, this embodiment will be described. Then, several modified examples will be described. Note that in this specification, components having equivalent functions are given the same reference numerals in each drawing referred to in different embodiments. Also, for convenience, the upper direction of the drawing will be described as the upper end side, and the lower direction will be described as the lower end side.

This Embodiment

Below, the functions, structure, operation, and effects of this embodiment will be described in the order of description with reference to the drawings.

Function and Structure of the Actuator of this Embodiment

Figure 2:
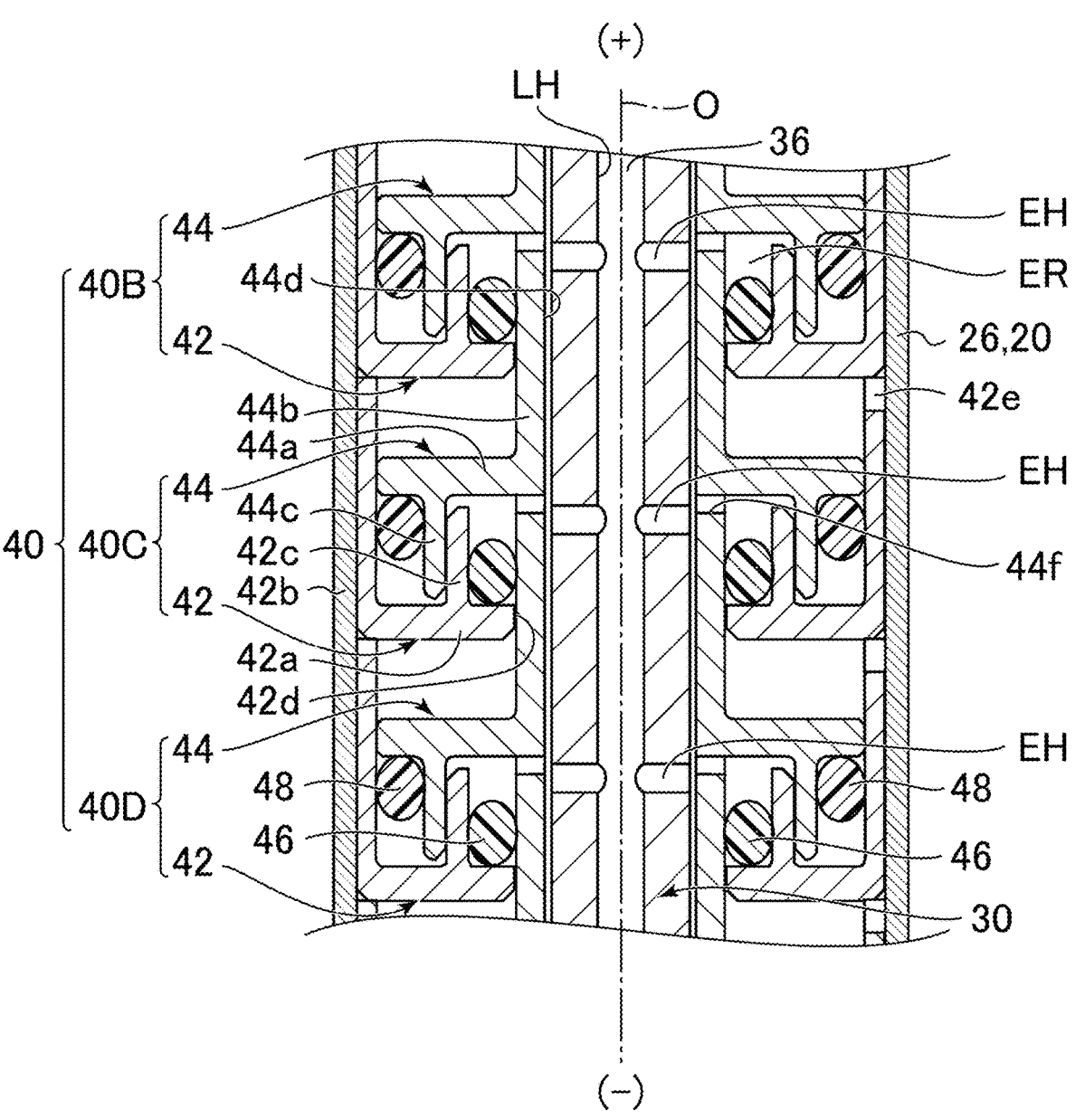
FIG. 2 is an enlarged view of the portion surrounded by dashed line A in FIG. 1.
Figure 3A:
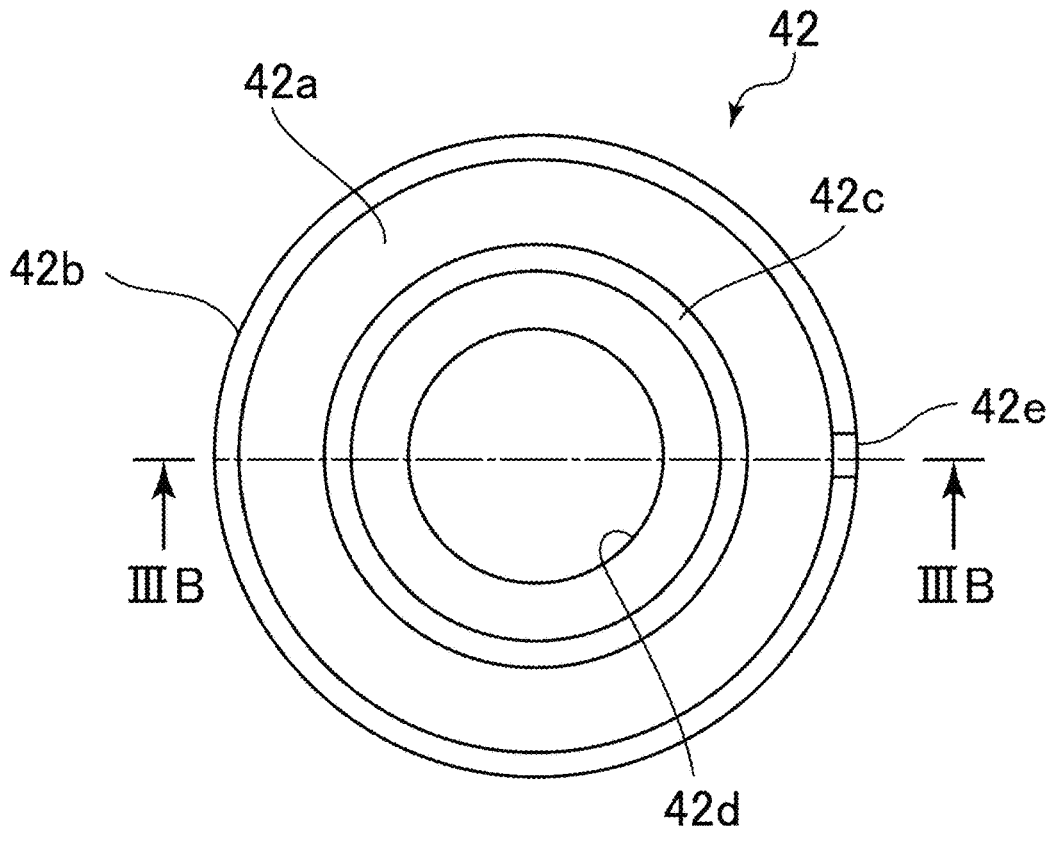
FIG. 3A is a top view of a partition body included in each of multiple assemblies of the actuator of this embodiment.
Figure 3B:
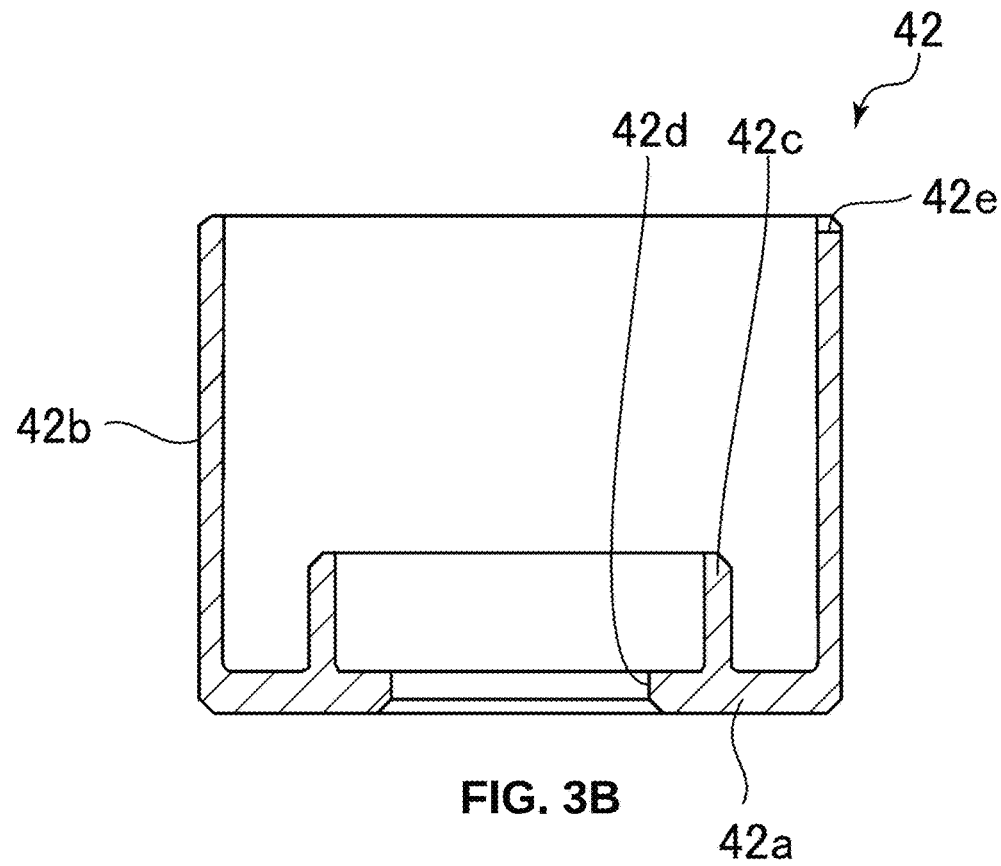
FIG. 3B is a vertical cross-sectional view of the partition body of FIG. 3A cut along a cutting line (IIIB) including its axis.
Figure 4A:
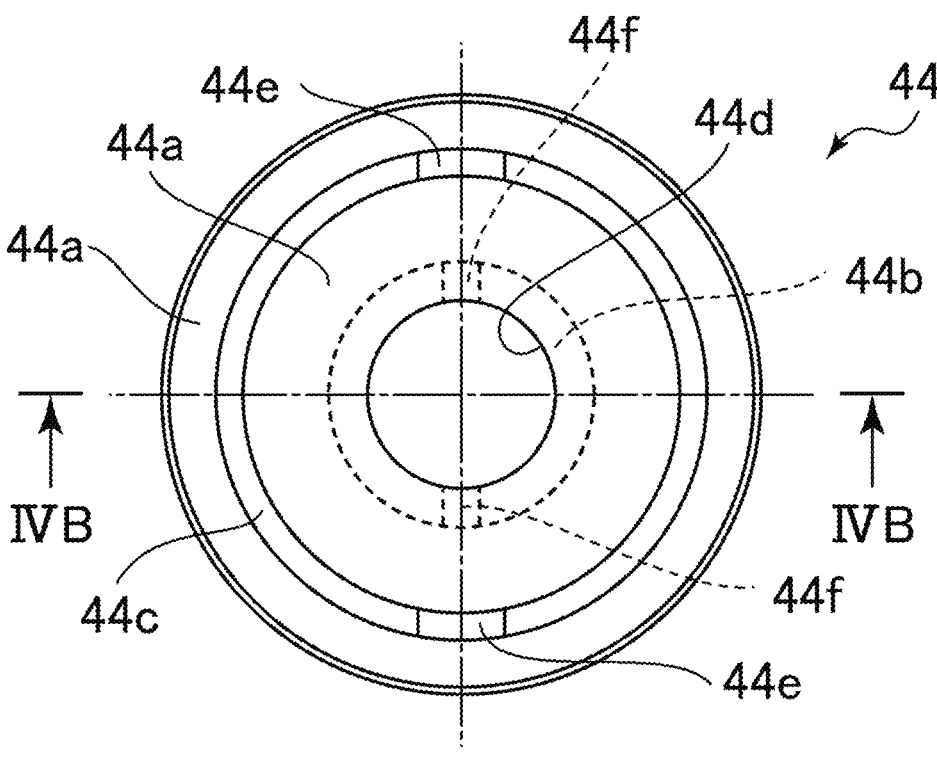
FIG. 4A is a bottom view of a piston body included in each of multiple assemblies of the actuator of this embodiment.
Figure 4B:
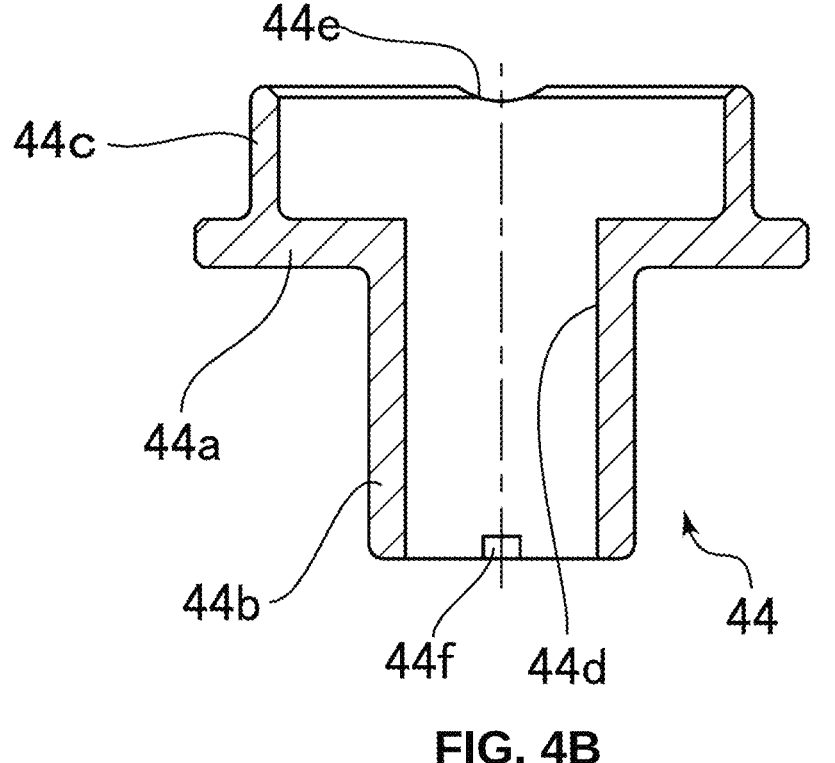
FIG. 4B is a vertical cross-sectional view of the partition body in FIG. 4A, cut along the cutting line (IVB) including its axis.
Figure 5:
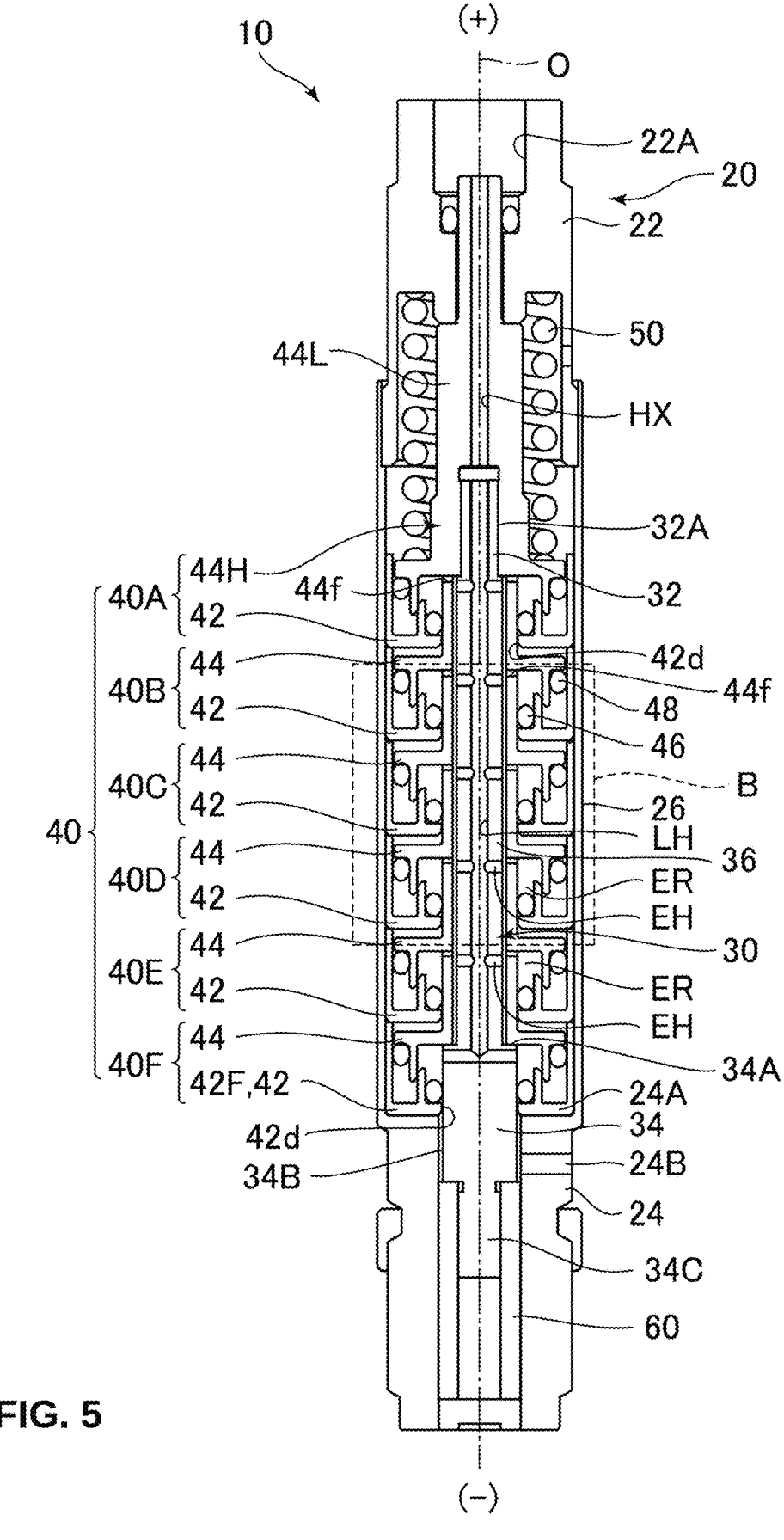
FIG. 5 is a diagram of the actuator of this embodiment, and is a vertical cross-sectional view in a state where a driving fluid has been introduced into the inside of the casing from the outside (at full stroke).
Figure 6:
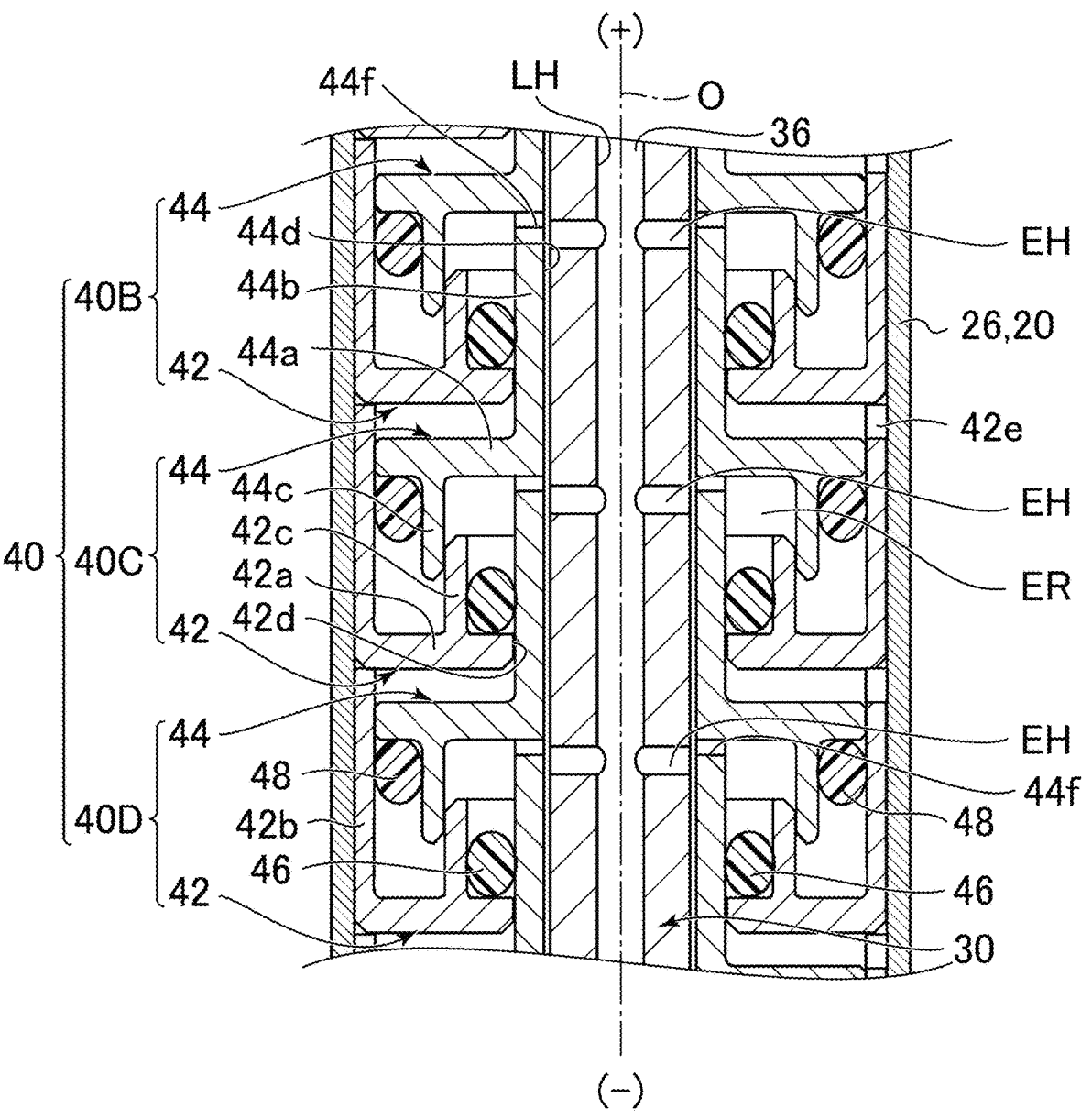
FIG. 6 is an enlarged view of the portion surrounded by dashed line B in FIG. 5.

FIG. 1 is a diagram of the actuator 10 of this embodiment, and is a vertical cross-sectional view in a state where no driving fluid is introduced into the inside of the casing 20 (at zero stroke). FIG. 2 is an enlarged view of the part surrounded by the dashed line A in FIG. 1. FIG. 3A is a top view of the partition body 42 of each of the multiple assemblies 40 of the actuator 10, and FIG. 3B is a vertical cross-sectional view of the partition body 42 of FIG. 3A cut along a cutting line (IIIB) including its axis. FIG. 4A is a bottom view of the piston body 44 of the assemblies 40B-40F other than the assembly 40A at the top end side in the axial direction of the casing 20 among the multiple assemblies 40, and FIG. 4B is a vertical cross-sectional view of the piston body 44 of FIG. 4A cut along a cutting line (IVB) including its axis. FIG. 5 is a diagram of the actuator 10, and is a vertical cross-sectional view in a state where a driving fluid is introduced from the outside into the inside of the casing 20 (at full stroke). FIG. 6 is an enlarged view of a portion surrounded by a dashed line B in FIG. 5.

As shown in FIGS. 1, 5, etc., the actuator 10 of this embodiment includes a casing 20, a shaft body 30, multiple assemblies 40, a coil spring 50 (an example of a biasing body), and a push rod 60. The actuator 10 of this embodiment has a function of moving a push rod 60 by moving the shaft body 30 from a zero-stroke position (see FIG. 1) to a full stroke position (see FIG. 5) when a driving fluid is introduced from its outside.

The actuator 10 will be described below by dividing it into each of the components.

Casing

As an example, the casing 20 of this embodiment is a cylindrical part as shown in FIGS. 1 and 5.

As an example, the casing 20 has a shape that is almost symmetrical about its own axis (indicated by the symbol O in the FIGs). The casing 20 has a through hole that runs from its upper end (the symbol + in the FIGs means the upper end side in the axial direction) to its lower end (the symbol – in the FIGs means the lower end side in the axial direction). The casing 20 in which the through hole is formed has a shape that has a structure described below to arrange the shaft body 30, the multiple assemblies 40, the coil spring 50, and the push rod 60 in a predetermined positional relationship inside the casing.

Here, for the sake of convenience, the casing 20 is divided into an upper casing 22, a lower casing 24, and a middle casing section 26 connecting the upper casing 22 and the lower casing 24. The upper casing 22, the middle casing section 26, and the lower casing 24 each have a structure for performing the following functions.

As shown in FIGS. 1 and 5, an inlet hole 22A is formed at the upper end of the upper casing 22 to introduce a driving fluid into the inside of the casing 20. Also, a recess is formed at the lower end of the upper casing 22 to accommodate the coil spring 50, which will be described later.

The lower casing 24 is configured so that a part of the shaft body 30 can be slidably inserted therethrough, the push rod 60 is disposed therein, and the lower casing 24 abuts against a partition body 42F of an assembly 40F that is disposed at the axially lowest end of the multiple assemblies 40. Here, the portion that abuts against the partition body 42F is an annular flat surface 24A. Also, a male thread for screwing into a body 80, which will be described later, is formed on the outer circumferential surface below a through hole 24B.

The middle casing section 26 is configured to accommodate a portion of the shaft body 30 and the multiple assemblies 40.

Shaft Body

As shown in FIGS. 1 and 5, the shaft body 30 of this embodiment is disposed inside the casing 20 along the axial direction of the casing 20. The shaft body 30 has a long hole LH formed in the center extending axially from the upper end to the lower end. In addition, the multiple exhaust holes EH are formed in the peripheral wall of the shaft body 30, which are connected to the long hole LH and arranged at a set interval along the axial direction. Here, in this embodiment, the number of exhaust holes EH is, for example, six, which is the same as the number of assemblies 40 described later.

The shaft body 30 has a function of exhausting the driving fluid introduced from the outside into the inside of the casing 20 to each closed space ER described later, and a function of moving in the axial direction to move the push rod 60 in response to the operation of other components.

The shaft body 30 is integrally formed of a shaft body's upper portion 32, a shaft body's lower portion 34, and a shaft body's intermediate portion 36 connecting the shaft body's upper portion 32 and the shaft body's lower portion 34.

The shaft body's upper portion 32 is a cylinder having a through hole in the axial direction and the male thread 32A formed on the outer circumferential surface. The through hole of the shaft body's upper portion 32 corresponds to a part of a long hole LH.

The shaft body's lower portion 34 is a cylinder having a hole opening at the upper end side in the axial direction and the lowest exhaust hole EH among the multiple exhaust holes EH. Here, the hole opening at the upper end side in the axial direction corresponds to the lowest end of the long hole LH, and the long hole LH communicates with the lowest exhaust hole EH at the position of its bottom surface. The outer diameter of the upper end of the shaft body's lower portion 34 is designed to fit into a through hole 42d (an example of a first through hole) of each partition body 42. In addition, the outer diameter of the upper end of the shaft body's lower portion 34 is designed to be equal to the outer diameter of a rod-shaped cylinder 44b of each piston body 44. The shaft body's lower portion 34 forms a step at the boundary with the shaft body's intermediate portion 36 described later. Here, the boundary portion between the shaft body's lower portion 34 and the shaft body's intermediate portion 36 is an annular flat plane 34A, and the outer circumferential surface is an outer circumferential surface 34B. The lower end of the shaft body's lower portion 34 is a cylinder having an outer diameter smaller than that of the upper end, and a connecting portion 34C is formed with a male thread for connecting the push rod 60 to the shaft body 30.

The shaft body's intermediate portion 36 is a cylinder having a through hole in the axial direction, and is connected to the shaft body's upper portion 32 at its upper end in the axial direction and to the shaft body's lower portion 34 at its lower end. All the exhaust holes EH (five exhaust holes EH in this embodiment) except for one exhaust hole EH formed in the shaft body's lower portion 34 out of the multiple exhaust holes EH are formed in the shaft body's intermediate portion 36. The shaft body's intermediate portion 36 is designed to pass through the through holes 44d (an example of second through holes) of each piston body 44 with a gap provided between each piston body 44.

Multiple Assemblies

The multiple assemblies 40 (the assemblies 40A, 40B, 40C, 40D, 40E, and 40F, described later) of this embodiment are arranged to overlap each other along the axial direction inside the casing 20, as shown in FIGS. 1 and 5.

Here, for the sake of convenience, the multiple assemblies 40 (six in total) arranged from the upper end side to the lower end side in the axial direction as shown in FIGS. 1 and 5 are referred to as the assemblies 40A, 40B, 40C, 40D, 40E, and 40F. The assemblies 40B, 40C, 40D, 40E, and 40F each have a partition body 42 and a piston body 44 of the same shape. In contrast, the assembly 40A has a partition body 42 of the same shape as the other assemblies 40 and a piston body 44H of a different shape.

First, the assemblies 40B, 40C, 40D, 40E, and 40F, which are identical in shape and structure, will be described, followed by the assembly 40A.

Multiple Assemblies 40B to 40F, Which are
Identical in Shape and Structure to Each Other The Assemblies 40B, 40C, 40D, 40E, and 40F of this
embodiment each have a partition body 42, a piston body 44,
a small diameter O-ring 46, and a large diameter O-ring 48,
as shown in FIGS. 1 to 6, and are fitted together to form an
assembly.

Partition Body

As shown in FIGS. 3A and 3B, each partition body 42 has
a disk body 42a, an outer cylindrical body 42b, and an inner
cylindrical body 42c.

A through hole 42d is formed in the center of the disk
body 42a. The outer diameter of the disk body 42a is
designed to be approximately the same as the inner diameter
of the middle casing section 26 of the casing 20.

The outer cylindrical body 42b protrudes from the entire
outer peripheral edge of the disk body 42a to one side in the
thickness direction of the disk body 42a (the axial upper end
side in this embodiment) and is approximately in contact
with the inner peripheral surface of the middle casing
section 26 of the casing 20. In addition, a notch 42e is
formed in the outer cylindrical body 42b penetrating its wall.
The notch 42e has the function of exhausting air on the
upper surface of the piston body 44 when the piston body 44
rises.

The inner cylindrical body 42c is disposed between the
through hole 42d and the outer cylindrical body 42b, and
protrudes from the disk body 42a in the same direction as the
outer cylindrical body 42b. The protruding height of the
inner cylindrical body 42c is designed to be lower than the
protruding height of the outer cylindrical body 42b.

As shown in FIG. 1, the partition bodies 42 are arranged
along the axial direction of the casing 20, with the tip of the
outer cylindrical body 42b of the adjacent partition body 42
abutting against the entire outer peripheral edge of the other
side surface in the thickness direction of the disk body 42a
of one partition body 42, while being biased by the coil
spring 50 via the piston body 44H from the upper end side
in the axial direction.

Piston Body

As shown in FIGS. 4A and 4B, each piston body 44 has
an opposing body 44a, a rod-shaped cylindrical body 44b,
and a fitting cylindrical body 44c.

The opposing body 44a is disk-shaped, has a through hole
44d formed in the center, faces the disk body 42a and the
inner cylindrical body 42c in the axial direction of the casing
20, and is designed to fit into the outer cylindrical body 42b
(see FIGS. 1, 2, 5, and 6).

The rod-shaped cylindrical body 44b protrudes from the
through hole 44d of the opposing body 44a to the opposite
side to the disk body 42a in the thickness direction of the
opposing body 44a (in this embodiment, the upper end side
of the axial direction of the casing 20), and its inner diameter
is designed not to abut against the outer peripheral surface
of the shaft body 30. In addition, a through hole 44f is
formed in a part of the peripheral wall of the rod-shaped
cylinder 44b to send the driving fluid exhausted from the
corresponding exhaust hole EH of the shaft body 30 into the
closed space ER. In FIGS. 4A and 4B, the through hole 44f
is shown in two directions, but it may be formed in three
directions, four directions, etc. The fitting cylindrical body
44c is arranged between the through hole 44d and the entire outer periphery of the opposing body 44a, protrudes from
the opposing body 44a toward the disk body 42a in the
thickness direction of the opposing body 44a, and is
designed to be slidably fitted into the inner cylindrical body
42c. The protruding height of the fitting cylindrical body 44c
is designed to be equal to the protruding height of the inner
cylindrical body 42c, as an example. As shown in FIGS. 4A
and 4B, the fitting cylindrical body 44c has a passage groove
44e formed therein to pass the driving fluid exhausted from
each exhaust hole EH of the shaft body 30.

As shown in FIG. 1, the piston bodies 44 are arranged
along the axial direction of the casing 20 with the tip of the
rod-shaped cylindrical body 44b of the adjacent piston body
44 abutting against the entire inner peripheral portion of the
surface on the other side in the thickness direction of the
opposing body 44a of one piston body 44. Also, as shown in
FIGS. 1 and 2, each piston body 44 is fitted into each
partition body 42 from the upper end side of the axial
direction of the casing 20. And, the piston body 44 of one
assembly 40 overlaps in the radial direction of the casing 20
with another assembly 40 (the assembly 40B as an example)
adjacent to the upper end side of the axial direction of the
casing 20 in the one assembly 40 (the assembly 40C as an
example).

The piston body 42F of the assembly 40F, which is
located at the axially lowest end of the casing 20 among the
multiple assemblies 40B to 40F, is supported by the annular
flat surface 34A of the shaft body's lower portion 34 of the
shaft body 30, as shown in FIGS. 1 and 5, and the assembly
40F forms a closed space ER together with the shaft body's
lower portion 34.

Small Diameter O-Ring and Large Diameter
O-Ring

As shown in FIGS. 1 and 2, the small diameter O-ring 46
is fitted between the inner cylinder 42c of the partition body
42 of one assembly 40 (assembly 40B as an example) and
the rod-shaped cylinder 44b of the piston body 44 of another
assembly 40 (assembly 40C as an example) adjacent to the
lower end side of the casing 20 in the axial direction of the
assembly 40 (assembly 40B), sealing the inner cylindrical
body 42c and the rod-shaped cylinder 44b.

As shown in FIGS. 1, 2, etc., the large diameter O-ring 48
is fitted between the outer cylindrical body 42b of the
partition body 42 of one assembly 40 (the assembly 40B as
one example) and the fitting cylindrical body 44c of the
piston body 44 of the one assembly 40 (the assembly 40B),
sealing the outer cylindrical body 42b and the fitting cylin-
drical body 44c.

The small diameter O-ring 46 and the large diameter
O-ring 48 form a closed space ER together with the partition
body 42 and piston body 44 of their assembly 40 (the
assembly 40B as one example) and the piston body 44 of
another assembly 40 (the assembly 40C as one example)
adjacent to the one assembly 40 (the assembly 40B).

Assembly 40A

Next, the assembly 40A of this embodiment will be
described with reference mainly to FIG. 1. The assembly
40A has a partition body 42, a piston body 44H (an example
of an uppermost piston body), a small diameter O-ring 46,
and a large diameter O-ring 48, which are fitted together to
form an assembly. Here, the partition body 42, the small diameter O-ring 46, and the large diameter O-ring 48 have respectively the same shapes as those of the assemblies 40B, 40C, 40D, 40E, and 40F.

Piston Body of Irregular Shape

As shown in FIGS. 1 and 5, the piston body 44H of this embodiment has a different shape from the piston body 44 of the assemblies 40B, 40C, 40D, 40E, and 40F. More specifically, the piston body 44H has an opposing body 44a, a rod-shaped cylindrical body 44L, and a fitting cylindrical body 44c. The piston body 44H differs from the piston body 44 in that the rod-shaped cylindrical body 44b of the piston body 44 is changed to the rod-shaped cylindrical body 44L.

The rod-shaped cylindrical body 44L is longer than the rod-shaped cylindrical body 44b, has a thicker peripheral wall, and has a larger outer diameter than the rod-shaped cylindrical body 44b.

The rod-shaped cylindrical body 44L has a through hole HX formed along its axis from the upper end to the lower end, which communicates with the inlet hole 22A at the upper end and the long hole LH of the shaft body 30 at the lower end, while being connected to the shaft body 30 at the lower end.

A female thread HY is formed on the inner peripheral surface of the lower end side (the shaft body 30 side) of the through hole HX of the rod-shaped cylinder 44L. The piston body 44 is connected to the shaft body 30 by screwing the female thread HY into the male thread 32A formed on the outer peripheral surface of the shaft body's upper portion 32 of the shaft body 30.

In this way, the uppermost piston body 44H is connected to the shaft body 30 by screwing, the lowermost piston body 44 is supported by the annular flat surface 34A of the shaft body's lower portion 34 of the shaft body 30, and the tip end of the rod-shaped cylindrical body 44b of the adjacent piston body 44 is abutted against the entire inner peripheral edge portion of the surface on the other side in the thickness direction of the opposing body 44a of one piston body 44. By adopting this structure, when the driving fluid is introduced from the shaft body 30 into the pressure chamber and moves in the valve opening direction, the multiple piston bodies 44 move together with the shaft body 30 without separating.

Coil Spring

As shown in FIGS. 1 and 5, the coil spring 50 of this embodiment is disposed between the recess formed in the upper casing 22 of the casing 20 and the opposing body 44a of the piston body 44H in a state compressed from its natural length, and has the function of biasing the piston body 44H from the upper end side to the lower end side. Specifically, the coil spring 50 abuts against the opposing body 44a of the piston body 44H to bias the piston body 44H.

Push Rod

The push rod 60 of this embodiment is disposed at the lower end of the casing 20 in the axial direction of the shaft body 30, and is configured to be movable with the movement of the shaft body 30 in the axial direction. In this embodiment, the push rod 60 is connected to the connecting part 34C of the shaft body's lower portion 34 of the shaft body 30 by screwing, for example.

Figure 7:
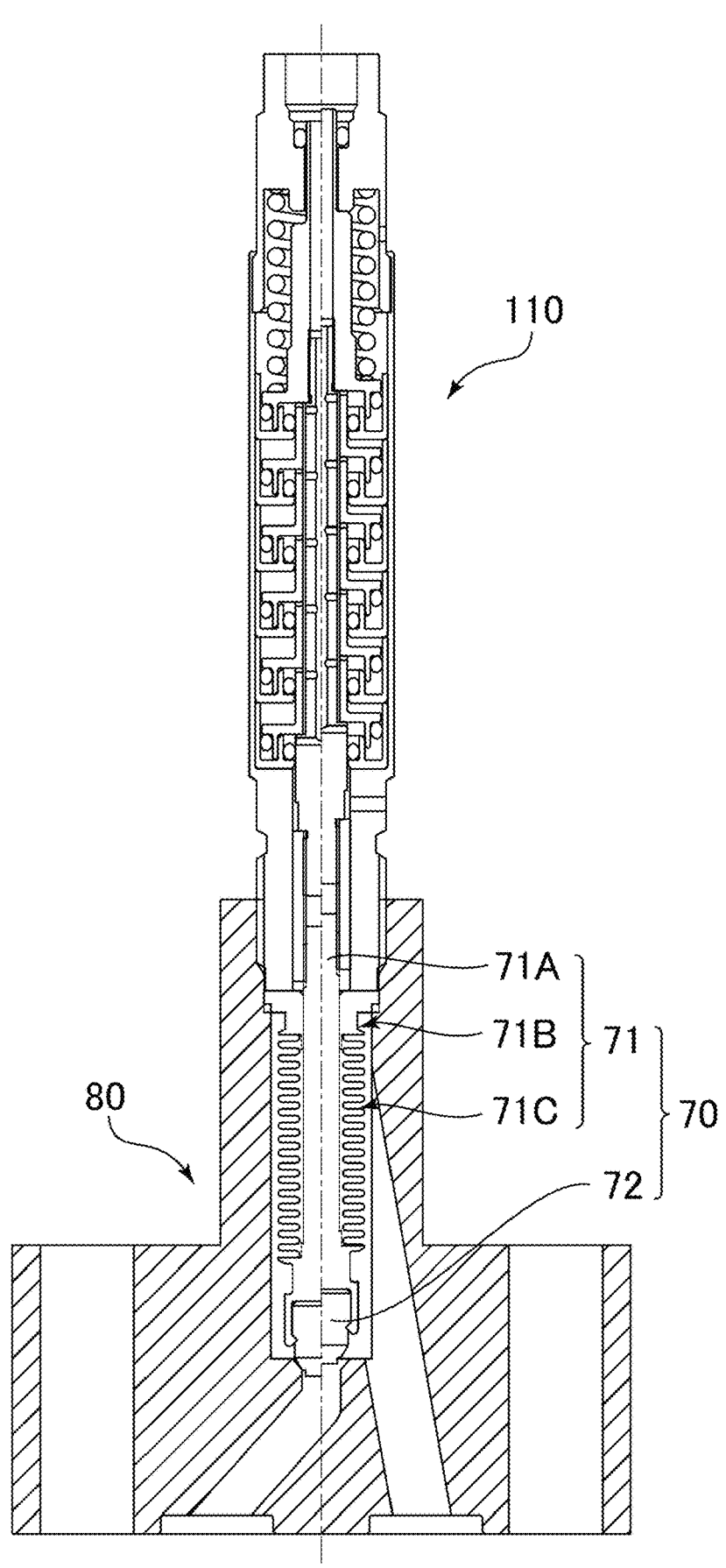
FIG. 7 is a longitudinal cross-sectional view of an open/close valve mechanism including an actuator of this embodiment.

Function and Structure of the Open/Close Valve Mechanism Including the Actuator of This Embodiment FIG. 7 is a vertical cross-sectional view of an open/close valve mechanism 110 including the actuator of this embodiment. The open/close valve mechanism 110 including the actuator of this embodiment (hereinafter referred to as the open/close valve mechanism 110) has the actuator 10 described above, a valve body 70, and a body 80.

Valve Body 70

The valve body 70 has a bellows structure as shown in FIG. 7, and the valve body 70 includes a welded bellows 71 and a disk packing 72.

The welded bellows 71 is formed by welding a stem 71A, a bellows flange 71B, and a bellows 71C as shown in FIG. 7. The upper end of the stem 71A is formed with a male thread that is connected to the lower end of the push rod 60 by screwing, and the lower end of the stem 71A is formed with a recess for accommodating the upper end of the disk packing 72.

The upper end of the disc packing 72 is fixed to the recess at the lower end of the stem 71A by means of rivet or the like, and the lower end abuts or is spaced from the opening of the flow passage formed in the body 80 (described later) all around the circumference, and has the function of connecting or blocking the fluid passing through the flow passage.

Body 80

As shown in FIG. 7, the body 80 is a block-shaped member in which multiple flow paths are formed, and defines inflow paths through which fluid flows in and outflow paths through which fluid flows out. One side of each flow path opens at the lower end side of the body 80, and the other side opens at a storage recess described below, and they communicate with each other. A female thread that screws into the male thread of the lower casing 24 is formed on the inner circumferential surface of the storage recess, and the actuator 10 is fixed to the body 80 by tightening it via the bellows flange 71B. In addition, through holes are formed at both longitudinal ends of the body 80 for inserting fastening bolts.

In other words, in the open/close valve mechanism 110, the lower end of the push rod 60 in the actuator 10 is screwed to the upper end of the valve body 70, and the actuator 10 is screwed to a recess formed in the body 80. The valve body 70 moves up and down with the operation of the actuator 10, which will be described later, to open and close the fluid flow path formed in the body 80, thereby controlling the supply and cut-off of the fluid.

In this embodiment, the valve body has a bellows structure, but this is not limited to this, and a diaphragm, for example, may be used. Also, the valve body 70 is configured to be connected to the push rod 60 by screwing, but it is also possible to form a female thread in the connection part 34C of the shaft body's lower portion 34 without disposing the push rod 60, and to connect the male thread of the upper end of the stem 71A to the female thread.

Operation of the Actuator and the Open/Close Valve Mechanism of this Embodiment Next, the operation of the actuator 10 and the open/close valve mechanism 110 of this embodiment will be described with reference to FIGS. 1, 5, and 7. An external device that supplies a driving fluid under the control of a control device (not shown) is attached to the inlet 22A formed in the casing 20 of the actuator 10. The control device outputs a rectangular pulse signal of an on signal-off signal at a set period, and causes the external device to supply the driving fluid during the period when the on signal is output, and does not cause the external device to supply the driving fluid during the period when the off signal is output.

The actuator 10 in the initial state (zero stroke state) is as shown in FIG. 1. In this state, the piston body 44H of the assembly 40A and each of the piston bodies 44 of the assemblies 40B to 40F are each located at the lowest end side in the axial direction among the movable positions.

First, the control device outputs a pulse signal to an external device, and when an ON signal is input to the external device, the driving fluid is introduced from the external device into the inlet hole 22A of the casing 20. The driving fluid introduced into the inlet hole 22A flows through the through hole HX of the piston body 44H and is further introduced into the long hole LH of the shaft body 30. The driving fluid supplied to the long hole LH is exhausted from the multiple exhaust holes EH that communicate with the long hole LH to each closed space ER formed in the multiple assemblies 40. The driving fluid exhausted to each closed space ER passes through the passage groove 44e and is supplied to the entirety of each closed space ER.

As the time that the driving fluid is exhausted from each exhaust hole EH increases, the pressure in each closed space ER increases. As a result, the piston body 44H of the assembly 40A and each piston body 44 of the assemblies 40B-F receive a force from each closed space ER from the lower end side to the upper end side in the axial direction of the casing 20. When this force exceeds the biasing force of the coil spring 50 that biases the piston body 44H from the upper end side in the axial direction and the frictional force received from all the small diameter O-rings 46 and the large diameter O-rings 48, the piston body 44H and each piston body 44 of the assemblies 40B-F move from the lower end side to the upper end side in the axial direction. Accordingly, the shaft body 30 connected to the piston body 44H also moves together with the piston body 44H. As a result, the push rod 60 connected to the shaft body 30 also moves together with the piston body 44H. FIG. 5 shows the actuator 10 in a state where the piston body 44H and each of the piston bodies 44 of the assemblies 40B-F, the shaft body 30, and the push rod 60 are located at the uppermost axial position among the movable positions (full stroke state) as a result of introducing a set amount of driving fluid into each closed space ER.

As the push rod 60 moves, the welded bellows 71 and the disk packing 72 move from the lower end side to the upper end side in the axial direction. This movement connects the fluid flow paths formed in the housing recess of the body 80, and the fluid flows.

Next, when the control device switches the pulse signal output to the external device to an off signal, the supply of the driving fluid from the external device to the inlet hole 22A of the casing 20 is stopped. As a result, the driving fluid is no longer supplied from each exhaust hole EH to each closed space ER. The driving fluid inside each closed space ER is discharged to the outside through the same flow path as when the driving fluid is introduced from the external device. Then, due to the reduction in pressure in each closed space ER and the biasing force of the coil spring 50, the actuator 10 goes from the full stroke state shown in FIG. 5 to the zero-stroke state.

Accompanying this movement, the welded bellows 71 and the disc packing 72 moves from the upper end side to the lower end side in the axial direction, closing the fluid flow path formed in the housing recess of the body 80. Thus, the fluid is shut off.

Fluid Control Device Including the Open/Close Valve Mechanism

Figure 8:
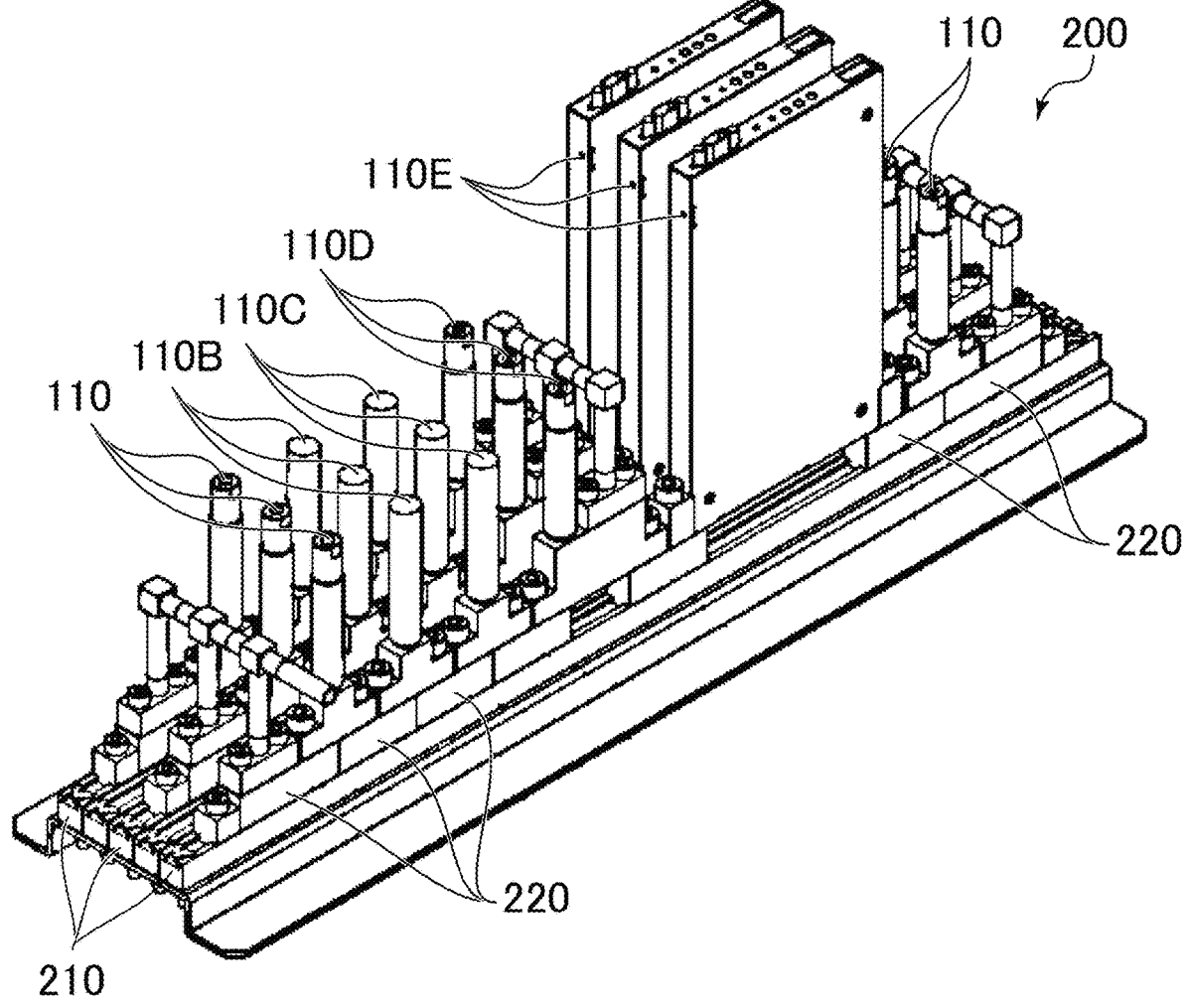
FIG. 8 is an external perspective view of a fluid control device including an open/close valve mechanism of this embodiment.

FIG. 8 is an external perspective view of a fluid control device 200 including the open/close valve mechanism 110. As shown in FIG. 8, the fluid control device 200 is provided with a metal base plate and rail members arranged along the width direction and extending in the longitudinal direction. A fluid control device including the open/close valve mechanism 110 of the present invention is installed on this rail member via multiple joint blocks, and the multiple joint blocks form flow paths through which the fluid flows from the upstream side to the downstream side.

Here, the fluid control device is a device used in a fluid control device that controls the flow of a fluid, and includes a body 80 that defines a fluid flow path. Specifically, the open/close valve mechanism 110, a regulator 110B, a pressure gauge 110C, an open/close valve (a three-way valve) 110D, a mass flow controller 110E, etc. are included, but are not limited to these.

Effects of the Actuator and the Open/Close Valve Mechanism of this Embodiment Next, the effects of the actuator 10 and the open/close valve mechanism 110 of this embodiment will be described with reference to the drawings.

First Effect

This effect is due to the structure in which the multiple piston bodies 44 are arranged integrally with the shaft body 30 without abutting against the shaft body 30 and are arranged in the axial direction of the casing 20.

For example, in the case of the structure of the above-mentioned prior art, multiple assemblies (combinations including partitions and piston bodies) adopt a structure (hereinafter referred to as a comparative embodiment) in which the cylindrical shaft rods constituting each piston body are arranged in the axial direction to form a pressure chamber (corresponding to the closed space in this embodiment) into which the driving fluid is introduced in each assembly (see FIG. 9). That is, in the actuator of this comparative embodiment, multiple assemblies each composed of each piston body and each partition are stacked in the axial direction by these assemblies alone, and are arranged inside the casing body with the upper end side biased by a coil spring.

Figure 9:
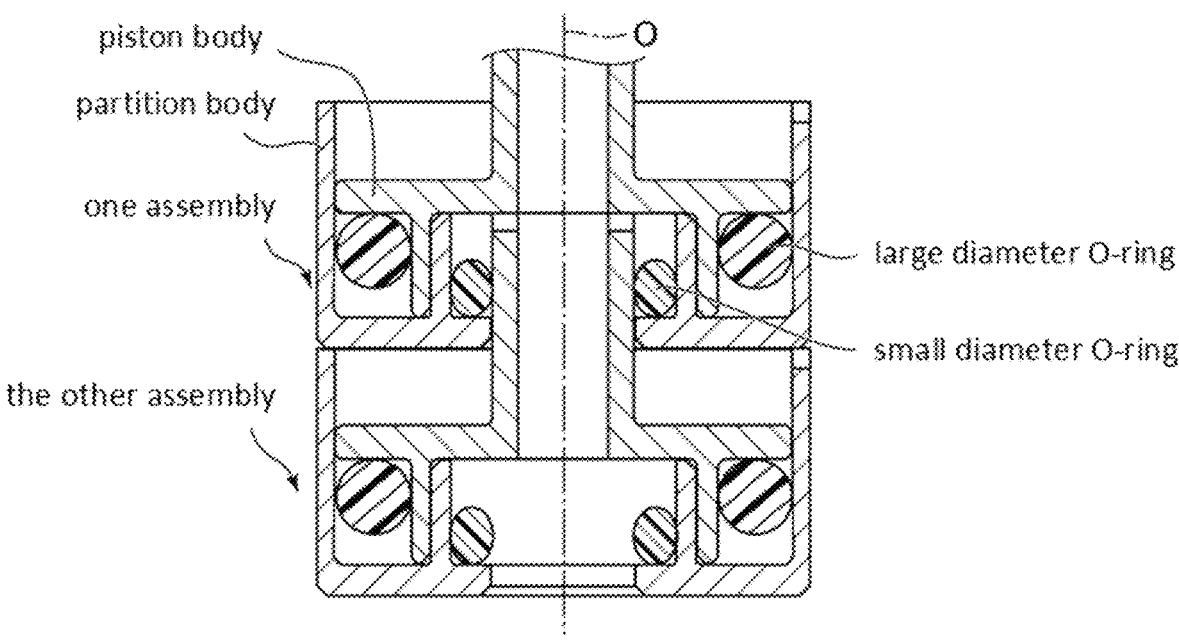
FIG. 9 is a diagram of two adjacent assemblies of an actuator of a comparative embodiment, showing longitudinal cross-sectional views of the two piston bodies before and after the introduction of the driving fluid into the interior of the casing.
Figure 9:
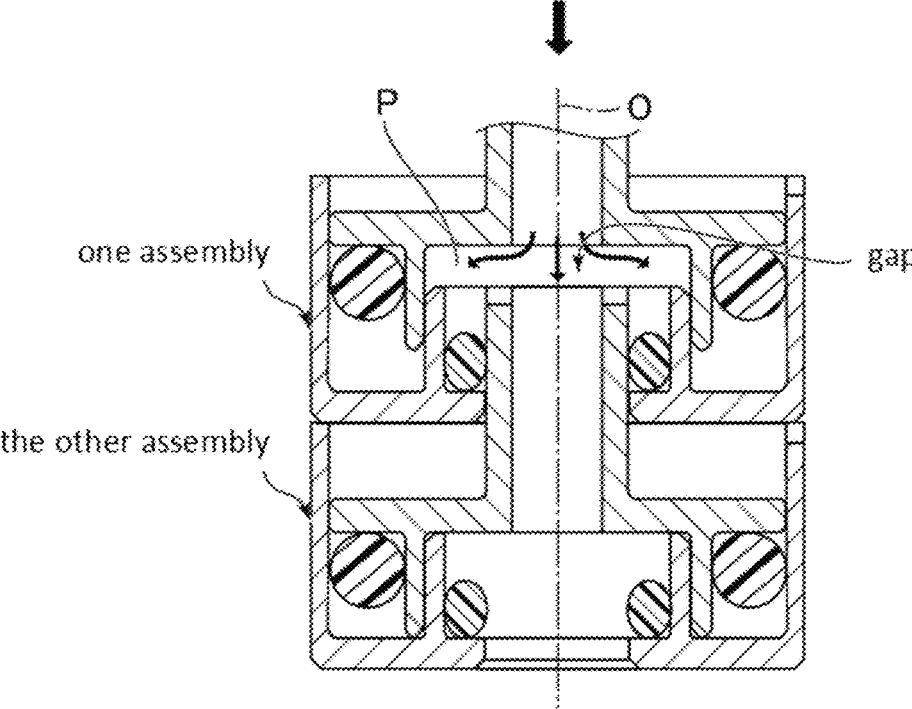

As described above, in the case of the actuator of the comparative embodiment, immediately after the driving fluid introduced into the casing body from the outside is sent into the pressure chamber of one assembly, the piston body of the one assembly separates from the piston bodies of the other assemblies, and the piston bodies rise in the order of their arrangement, that is, there is a risk that the multiple piston bodies do not rise as one unit (see FIG. 9). As a result, a time lag occurs between the introduction of the driving fluid into the casing and the time when the push rod reaches a full-stroke state.

In contrast, in the case of this embodiment, the uppermost piston body 44H of the multiple piston bodies 44 is fixed to the shaft body 30 by screwing, the lowermost piston body 44 abuts against the upper end surface of the shaft body's lower portion 34, and the individual piston bodies also abut in the axial direction, and the shaft body 30 and the multiple piston bodies are arranged integrally in the axial direction of the casing 20 (see FIGS. 1, 2, 5, and 6). Accordingly, in the case of this embodiment, one piston body 44 does not separate and move.

Therefore, the actuator 10 of this embodiment has better responsiveness than the comparative embodiment (the time from when the driving fluid is introduced into the casing 20 until the push rod 60 reaches a full stroke state is short).

As described above, the actuator of the comparative embodiment employs a structure in which the cylindrical shaft rods of the piston bodies are arranged in the axial direction to form an air flow path for the driving fluid, thereby forming a pressure chamber into which the driving fluid is introduced in each assembly (see FIG. 9). Due to mechanical tolerances such as the machining accuracy and dimensional variation of each shaft rod, there is a risk that the axes of the axial air passages of each piston body may be misaligned due to mechanical tolerances. If such misalignment becomes a flow path resistance of the driving fluid, the time until the driving fluid reaches each pressure chamber will be delayed accordingly.

In contrast, in the case of this embodiment, in the first place, there is no increase in flow path resistance in the flow path for passing the driving fluid through each closed space ER, as in the comparative embodiment.

Therefore, the actuator 10 of this embodiment has less individual variation in responsiveness than the comparative embodiment.

As described above, the actuator of the comparative embodiment employs a structure in which the cylindrical shaft rods constituting each piston body are arranged in the axial direction to form a pressure chamber into which the driving fluid is introduced in each assembly. That is, each shaft rod of the comparative embodiment is required to function as an axial flow path and as a shaft body that moves in the axial direction. Here, to improve the responsiveness required of the actuator, for example, it is preferable to increase the cross section (flow path area) of the air passage of each shaft rod. However, the larger the cross section of the air passage of each shaft rod is, in other words, the thinner the peripheral wall of each shaft rod is, the more difficult it becomes to maintain its own shape while exerting a reaction force on the small diameter O-ring 46. As a result, it becomes difficult for each shaft rod to move stably along the axial direction.

In contrast, in the actuator 10 of this embodiment, the shaft body 30, not each piston body 44, is given the function of a flow path in the axial direction (see FIGS. 2, 6, etc.). That is, in the case of this embodiment, the function of the air passage for the driving fluid introduced into each pressure chamber is given to the shaft body 30, which is a separate member, instead of each piston body 44, so that the above problem that may occur in the comparative embodiment does not occur.

According to the actuator 10 of this embodiment, the movement of each piston body 44, 44H in the axial direction is more stable than in the comparative embodiment. Therefore, according to the actuator 10 of this embodiment, the durability of each assembly 40 is higher than in the comparative embodiment.

Second Effect

This effect is due to the piston body 44H being connected to the shaft body 30.

As shown in FIGS. 1 and 5, the female thread HY is formed on the inner peripheral surface of the lower end side (the shaft body 30 side) of the through hole HX of the rod-shaped cylinder 44L. The rod-shaped cylinder 44L is connected to the shaft body 30 by screwing the female thread HY into the male thread 32A formed on the outer peripheral surface of the shaft body's upper portion 32 of the shaft body 30.

Therefore, according to the actuator 10 of this embodiment, the piston body 44H can be connected to the shaft body 30 without using parts (e.g., screws, screw holes, etc.) for connecting the piston body 44H to the shaft body 30 and without increasing the flow resistance.

Third Effect

This effect is due to the push rod 60 being connected to the shaft body 30.

In the case of the structure of the prior art mentioned above, the push rod is not fixed to a part of the multiple assemblies. Therefore, the push rod can move from a fixed position in the axial direction to another fixed position due to the operation of the actuator of this configuration, but the reverse is not possible.

In contrast, in the actuator 10 of this embodiment, as shown in FIGS. 1 and 5, the push rod 60 is connected to the connecting portion 34C of the shaft body 30.

Therefore, according to the actuator 10 of this embodiment, the push rod 60 can be moved in conjunction with the movement of the shaft body 30 in both axial directions.

Fourth Effect

This effect is due to the fact that the multiple assemblies 40 are arranged integrally, each penetrating the shaft body 30.

As mentioned above, the actuator of the comparative embodiment adopts a structure in which the shaft rods constituting each piston body are connected in the axial direction (see FIG. 9). Therefore, due to mechanical tolerances such as machining accuracy and dimensional variation of each shaft rod, there is a risk that one piston body will move in the axial direction while shifting from the axis of the partition into which the tip of the piston body is fitted. As a result, the small diameter O-ring sandwiched between the one piston body and the partition will deform only in a circumferentially biased portion due to this shift, and the shape will become habitual.

In contrast, in the case of this embodiment, since the multiple assemblies 40 are arranged integrally, each penetrating the shaft body 30 (see FIGS. 1 and 5), the above-mentioned problem of shifting that may occur in the comparative embodiment does not occur or is unlikely to occur in the first place.

Therefore, according to the actuator 10 of this embodiment, the small diameter O-ring 46 and the large diameter O-ring 48 are less likely to deform unevenly compared to the comparative embodiment. Accordingly, in the actuator 10 of this embodiment, each assembly 40 is less likely to break (has high durability) compared to the comparative embodiment.

Other Effects

In addition, in the open/close valve mechanism 110 using the actuator 10 of this embodiment, since the valve body 70 is connected to the push rod 60, the valve body 70 can be moved in accordance with the movement of the shaft body 30 in both axial directions in the same way as the push rod 60.

In addition, as the open/close valve mechanism 110 using the actuator 10, a structure in which the push rod 60 is not provided can also be implemented. In this case, if a connecting portion 34C to which the valve body 70 can be connected is designed to the shaft body's lower portion 34, and the valve body is configured to move in accordance with the operation of the actuator 10, an effect similar to the third effect can be obtained.

Multiple Modifications

As described above, the present invention has been described using the above-mentioned embodiment as an example, but the present invention is not limited to this embodiment. The technical scope of the present invention includes, for example, several modified examples described below.

For example, in this embodiment, the number of the multiple assemblies 40 is described as six. However, the number of the multiple assemblies 40 does not have to be six. For example, it may be two to five, seven or more.

Furthermore, for example, in this embodiment, the push rod 60 is described as being housed inside the casing 20. However, the push rod 60 may be disposed outside the casing 20. In addition, the push rod 60 does not have to be a component of the actuator 10, as long as the valve body 70 can communicate or block the flow path in accordance with the operation of the actuator 10.

Furthermore, for example, in the present embodiment, the coil spring 50 is disposed on the upper end side of the casing 20 in the axial direction. However, it may be modified by disposing the coil spring 50 on the lower end side of the casing 20 in the axial direction and disposing the multiple assemblies 40 in a reversed orientation in the axial direction. As a result, the actuator 10 of this embodiment can be modified into an actuator (not shown) in which the zero stroke position and the full stroke position are reversed.

Furthermore, for example, in this embodiment, each assembly 40 is described as having a small diameter O-ring 46 and a large diameter O-ring 48. However, if multiple closed spaces ER can be formed inside the casing 20 using the partition body 42F and the piston body 44, one or both small diameter O-ring 46 and the large diameter O-ring 48 may be omitted. For example, one or both small diameter O-ring 46 and the large diameter O-ring 48 may be rubber rings with a rectangular cross section.

Furthermore, for example, in this embodiment, the outer diameter of the shaft body 30 and the inner diameter of the rod-shaped cylindrical body 44b of the piston body 44 are designed not to abut against each other, and the multiple assemblies 40 are arranged integrally with the shaft body 30 without abutting against the shaft body 30. However, as long as the exhaust hole EH of the corresponding shaft body 30 and the through hole 44f formed in the rod-shaped cylinder 44b overlap radially and the driving fluid is introduced into each closed space ER, the shaft body 30 and the piston body 44 may be engaged with each other, and this engagement makes it easier for the shaft body 30 and the piston body 44 to move together, resulting in an actuator with superior responsiveness.

EXPLANATION OF SYMBOLS

10 actuator
20 casing
22 upper casing
22A inlet hole
24 lower casing
24A flat surface (an example of abutment surface)
24B through hole
26 middle casing section
30 shaft body
32 shaft body's upper portion
32A male thread
34 shaft body's lower portion
34A annular flat plane
34B outer circumferential surface
36 shaft body's intermediate portion
40 assembly
40A assembly
40B assembly
400 assembly
40F assembly
42 partition body
42F partition body (an example of the lowest partition body)
42a disk body
42b outer cylindrical body
42c inner cylindrical body
42d through hole (an example of a first through hole)
42e notch
44 piston body
44H piston body (an example of an uppermost piston body)
44L rod-shaped cylindrical body
44a opposing body
44b rod-shaped cylindrical body
44c fitting cylindrical body
44d through holes (an example of a second through hole)
44e passage groove
44f through hole
46 small diameter O-ring
48 large diameter O-ring
50 coil spring (an example of a biasing body)
60 push rod
110 open/close valve mechanism
70 valve body
71 welded bellows
71A stem
71B bellows flange
71C bellows
72 disk packing
80 body
200 fluid control device
210 gas lines
220 block joint
110B regulator
110C pressure gauge
110D open/close valve (a three-way valve)
110E mass flow controller
EH exhaust hole
ER closed space
HX through hole (an example of a third through hole)
HY female thread
LH long hole

The invention claimed is:

1. An actuator comprising:

a casing having an inlet hole formed at one end through which a driving fluid is introduced from an outside the casing;

a shaft body arranged inside the casing along the axial direction of the casing, formed with an elongated hole that opens in the same direction as the inlet hole and runs along the axial direction, and multiple exhaust holes that communicate with the elongated holes and are arranged at set intervals along the axial direction, and introducing the driving fluid introduced from the inlet through the opening of the elongated hole and discharging the driving fluid from the multiple exhaust holes;

a partition body includes a disk body having a first through hole formed in the center, and an outer cylindrical body standing on the periphery of the disk body and abutting against the inner peripheral surface of the casing;

multiple assemblies consist of a piston body having a rod-shaped cylindrical body that is inserted into the first through hole and has a second through hole formed in the center, and are arranged at multiple positions inside the casing corresponding to the multiple exhaust holes; and, a biasing body disposed within the casing, wherein:

each partition body in the multiple assemblies abuts against the adjacent partition body in the axial direction at the end surface of the outer cylindrical body and the disk body, and each piston body abuts against the adjacent piston body in the axial direction at the rod-shaped cylindrical body;

each piston body has the shaft body passing through the second through hole so that the shaft body can abut against the piston body, and together with each partition body, forms a closed space communicating with each exhaust hole at each position of the multiple exhaust holes;

one of the piston bodies located on the most one end side or the most other end side is connected to the shaft body; and, the biasing body biases the piston body connected to the shaft body in a direction against the pressure of the driving fluid.

2. The actuator according to claim 1, wherein:

an internal thread is formed on the inner peripheral surface of the other end of the second through hole in the piston body on the first end side;

an external thread is formed on the outer peripheral surface of one end side of the shaft body; and, the piston body at the first end is connected to the shaft body by screwing the internal thread and the external thread together.

3. The actuator according to claim 1, wherein:

the portion of the shaft body at the other end in the axial direction has a cylindrical body with an annular plane facing one end in the axial direction and an outer peripheral surface with the same outer diameter as the rod-shaped cylindrical body; and, the cylindrical body supports the piston body at the other end in the axial direction among all the piston bodies constituting the multiple assemblies with the annular plane, while forming the closed space together with the assembly at the other end in the axial direction among the multiple assemblies.

4. The actuator according to claim 3, wherein the other end portion in the axial direction has a connecting portion.

5. An open/close valve mechanism, the mechanism comprising:

an actuator, the actuator comprising:

a casing having an inlet hole formed at one end through which a driving fluid is introduced from an outside the casing;

a shaft body arranged inside the casing along the axial direction of the casing, formed with an elongated hole that opens in the same direction as the inlet hole and runs along the axial direction, and multiple exhaust holes that communicate with the elongated holes and are arranged at set intervals along the axial direction, and introducing the driving fluid introduced from the inlet through the opening of the elongated hole and discharging the driving fluid from the multiple exhaust holes;

a partition body includes a disk body having a first through hole formed in the center, and an outer cylindrical body standing on the periphery of the disk body and abutting against the inner peripheral surface of the casing;

multiple assemblies consist of a piston body having a rod-shaped cylindrical body that is inserted into the first through hole and has a second through hole formed in the center, and are arranged at multiple positions inside the casing corresponding to the multiple exhaust holes; and, a biasing body disposed within the casing, wherein:

each partition body in the multiple assemblies abuts against the adjacent partition body in the axial direction at the end surface of the outer cylindrical body and the disk body, and each piston body abuts against the adjacent piston body in the axial direction at the rod-shaped cylindrical body;

each piston body has the shaft body passing through the second through hole so that the shaft body can abut against the piston body, and together with each partition body, forms a closed space communicating with each exhaust hole at each position of the multiple exhaust holes;

one of the piston bodies located on the most one end side or the most other end side is connected to the shaft body; and, the biasing body biases the piston body connected to the shaft body in a direction against the pressure of the driving fluid.

6. The open/close valve mechanism according to claim 5, having a bellows structure connected to the connecting portion.

7. The open/close valve mechanism according to claim 5, wherein:

an internal thread is formed on the inner peripheral surface of the other end of the second through hole in the piston body on the first end side;

an external thread is formed on the outer peripheral surface of one end side of the shaft body; and, the piston body at the first end is connected to the shaft body by screwing the internal thread and the external thread together.

8. The open/close valve mechanism according to claim 5, wherein:

the portion of the shaft body at the other end in the axial direction has a cylindrical body with an annular plane facing one end in the axial direction and an outer peripheral surface with the same outer diameter as the rod-shaped cylindrical body; and, the cylindrical body supports the piston body at the other end in the axial direction among all the piston bodies constituting the multiple assemblies with the annular plane, while forming the closed space together with the assembly at the other end in the axial direction among the multiple assemblies.

9. The open/close valve mechanism according to claim 8, wherein the other end portion in the axial direction has a connecting portion.

10. A fluid control device, the fluid control device comprising:

an open/close valve mechanism, the mechanism comprising:

an actuator, the actuator comprising:

a casing having an inlet hole formed at one end through which a driving fluid is introduced from outside the outside;

a shaft body arranged inside the casing along the axial direction of the casing, formed with an elongated hole that opens in the same direction as the inlet hole and runs along the axial direction, and multiple exhaust holes that communicate with the elongated holes and are arranged at set intervals along the axial direction, and introducing the driving fluid introduced from the inlet through the opening of the elongated hole and discharging the driving fluid from the multiple exhaust holes;

a partition body includes a disk body having a first through hole formed in the center, and an outer cylindrical body standing on the periphery of the disk body and abutting against the inner peripheral surface of the casing;

multiple assemblies consist of a piston body having a rod-shaped cylindrical body that is inserted into the first through hole and has a second through hole formed in the center, and are arranged at multiple positions inside the casing corresponding to the multiple exhaust holes; and, a biasing body disposed within the casing, wherein:

each partition body in the multiple assemblies abuts against the adjacent partition body in the axial direction at the end surface of the outer cylindrical body and the disk body, and each piston body abuts against the adjacent piston body in the axial direction at the rod-shaped cylindrical body;

each piston body has the shaft body passing through the second through hole so that the shaft body can abut against the piston body, and together with each partition body, forms a closed space communicating with each exhaust hole at each position of the multiple exhaust holes;

one of the piston bodies located on the most one end side or the most other end side is connected to the shaft body; and, the biasing body biases the piston body connected to the shaft body in a direction against the pressure of the driving fluid; and a bellows structure connected to the connecting portion.

\* \* \* \* \*